United States Patent [19]

Kurihara et al.

[11] Patent Number: 4,905,860
[45] Date of Patent: Mar. 6, 1990

[54] SPEAKER BOX

[75] Inventors: Norimitsu Kurihara; Junichi Kamata, both of Wako, Japan

[73] Assignee: Honda Giken Kogyo Kabushiki Kaisha, Tokyo, Japan

[21] Appl. No.: 195,331

[22] Filed: May 18, 1988

[30] Foreign Application Priority Data

May 20, 1987 [JP] Japan .................... 62-122984

[51] Int. Cl.⁴ .............................. H04R 1/02
[52] U.S. Cl. .............................. 220/72; 381/86
[58] Field of Search .................. 220/72; 296/152; 381/86, 188, 205

[56] References Cited

U.S. PATENT DOCUMENTS

| 4,099,026 | 7/1978 | Persson et al. | 381/188 |
| 4,337,380 | 6/1982 | Tezuka et al. | 381/205 |
| 4,362,907 | 12/1982 | Polacsek | 381/188 X |
| 4,541,529 | 9/1985 | Hestehave et al. | 220/94 R X |
| 4,728,143 | 3/1988 | Tanino et al. | 296/146 X |
| 4,781,314 | 11/1988 | Schoonover et al. | 220/76 X |
| 4,790,407 | 12/1988 | Yamamoto et al. | 381/86 X |

FOREIGN PATENT DOCUMENTS

| 136198 | 8/1983 | Japan | 381/188 |
| 2021185 | 11/1979 | United Kingdom | 220/72 |

Primary Examiner—Stephen M. Hepperle
Attorney, Agent, or Firm—Armstrong, Nikaido Marmelstein Kubovcik & Murray

[57] ABSTRACT

A speaker box for housing a radio speaker unit and intended for mounting within a vehicle door is formed of plastic by a monobloc molding method such as blow molding thus providing a seamless speaker box that is free from air leakage. The speaker box has an irregular configuration matching a space within the vehicle door, whereby it can be firmly secured in place maintaining maximum inner volume. The speaker box further has ribs extending across flat regions on the box thus improving its rigidity against vibration caused by sound pressure and the like.

7 Claims, 3 Drawing Sheets

SPEAKER BOX

BACKGROUND OF THE INVENTION

1. Field of the Invention

This invention is directed to a speaker box, more particularly to a speaker box for a radio or the like that is suitable for mounting in an automobile.

2. Description of the Prior Art

It has become common practice to make speaker boxes and/or speaker covers for car radios of plastic as can be seen from, for example, published examined Japanese patent application No. 57(1982)-9274.

The conventional plastic speaker boxes are generally formed by injection molding and thus have to be molded in at least two separate parts. The separately formed parts are then fastened together by screws, bonding, welding or the like.

When assembling a speaker box by one of these methods, however, it is necessary to ensure snug and precision fitting of the joint faces with one another. This need arises because if the speaker box should allow any leakage of air, noise will be produced when air pressurized by the movement of the speaker cone escapes from the speaker box. In severe cases, there may even be an adverse effect on acoustic performance such as, for example, a lowering of the sound pressure in the low frequency range. When the speaker box components are assembled using screws, for example, it is necessary to use a packing material between the joined edges, or to use components made of thick material so as to ensure proper sealing by virtue of the plastic deformation of the component material, or to space the screws at close intervals. However the assembly is accomplished, the conventional method of forming speaker boxes by injection molding turns out to involve a relatively large number of complicated fabrication steps and to result in relatively high production cost. Moreover, with the conventional method, no matter how much care is used to ensure proper sealing among the components during assembly, there will always remain some possibility of air leakage. On the other hand, it is not easy to detect faulty sealing prior to product shipment.

SUMMARY OF THE INVENTION

In view of the aforesaid shortcomings of the prior art, it is an object of the present invention to provide a speaker box that is free from the problem of sealing among components, is constituted of a relatively small number of components, can be fabricated by a relatively small number of steps, and is relatively inexpensive to produce.

The invention realizes this object by providing a speaker box for housing an acoustic speaker unit, wherein the speaker box is so constituted as to be formable by monobloc blow molding.

The above and other features of the present invention will become apparent from the following description made with reference to the drawings.

DESCRIPTION OF THE PREFERRED EMBODIMENTS

Figure 3:
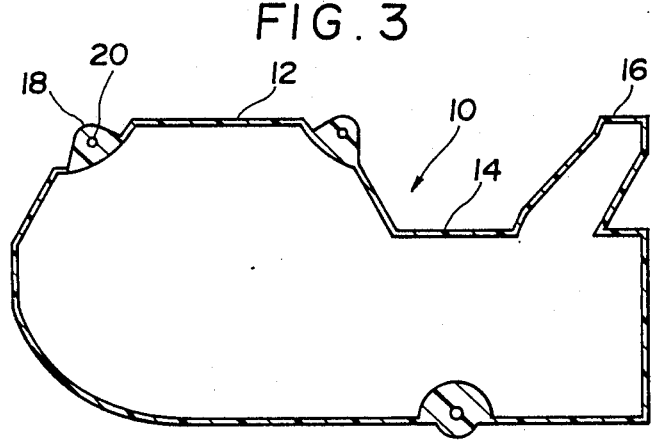
FIG. 3 is a sectional view taken along line III—III in FIG. 2.

The speaker box 10 illustrated in the drawings is comprised generally of a generally disc-shaped main body 12, a rectangular or box-like section 14 formed integrally with the main body 12, and a projecting section 16 formed integrally with the rectangular section 14. The main body 12, rectangular section 14 and projecting section 16 are not formed separately but, as shown in the sectional view of FIG. 3, are formed integrally with each other. This monobloc structure is obtained by blow molding a synthetic resin material such as polypropylene. The method of blow molding is well known and will not be explained here. Since the speaker box 10 is molded as a single, integral unit and is not composed of a plurality of components, it is free from any problem regarding sealing and is thus free from any possibility of air leakage or the like. Also, by token of its not consisting of a plurality of components, it does not require any assembly steps and therefore can be fabricated inexpensively. Moreover, the cost of fabrication is further reduced by the fact that a die for blow molding is less costly than one for injection molding.

The main body 12 has two screw bracket portions 18 formed by thinning appropriate portions of the periphery thereof. The rectangular section 14 is similarly formed with one screw bracket portion 18. Each of the screw bracket portions 18 has a screw hole 20. The screw bracket portions 18 are used for attaching the speaker box 10 to a vehicle door, as will be explained later. The main body 12 further has a large opening 22 near the center thereof. As will be explained later in conjunction with FIG. 8, a speaker 24 is mounted within this opening. A port 26 is provided at an appropriate location in the vicinity of the large opening 22 for providing the effect of the bass reflex.

Figure 2:
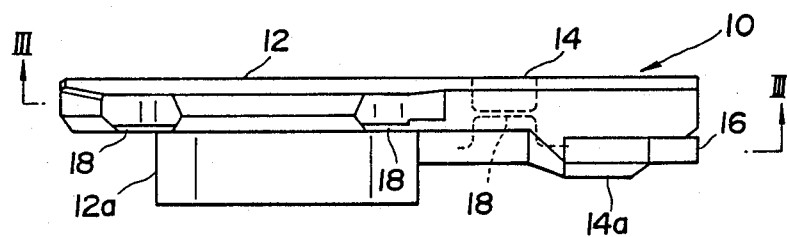
FIG. 2 is a front view of the same.
Figure 4:
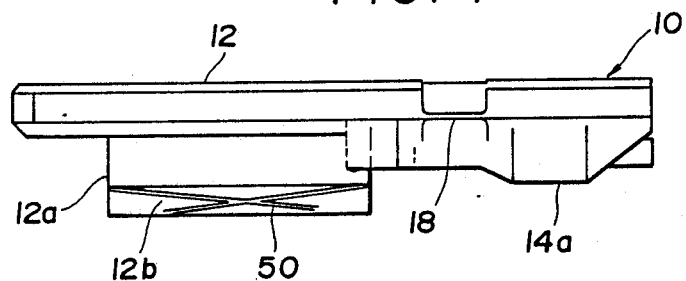
FIG. 4 is a back view of the speaker box.
Figure 5:
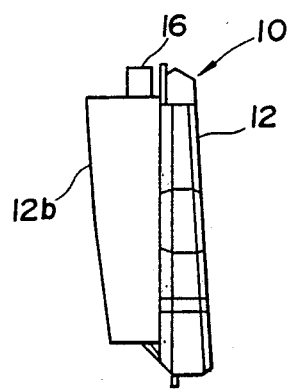
FIG. 5 is a left side view of the same.
Figure 6:
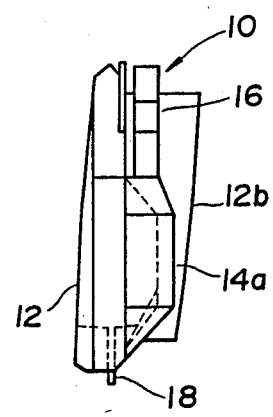
FIG. 6 is a right side view of the same.

As best illustrated in FIGS. 2 and later figures, the back surface of the main body 12 has a cylindrical section 12a projecting therefrom. As can be best seen in the left side view in FIG. 5, the cylindrical section 12a has a flat floor 12b which slopes to one side. Moreover, as best seen in FIGS. 2 and 4, as a whole the back surface of the rectangular section 14 projects rearwardly and at a raised portion formed midway thereof is provided with a protuberance 14a. The projecting section 16 extends diagonally out from the rectangular section 14. The speaker box 10 is formed in the aforesaid irregular shape so that when it is mounted within a vehicle door it will be able to have the largest internal volume possible, and also so that it can be held securely in place.

Figure 7:
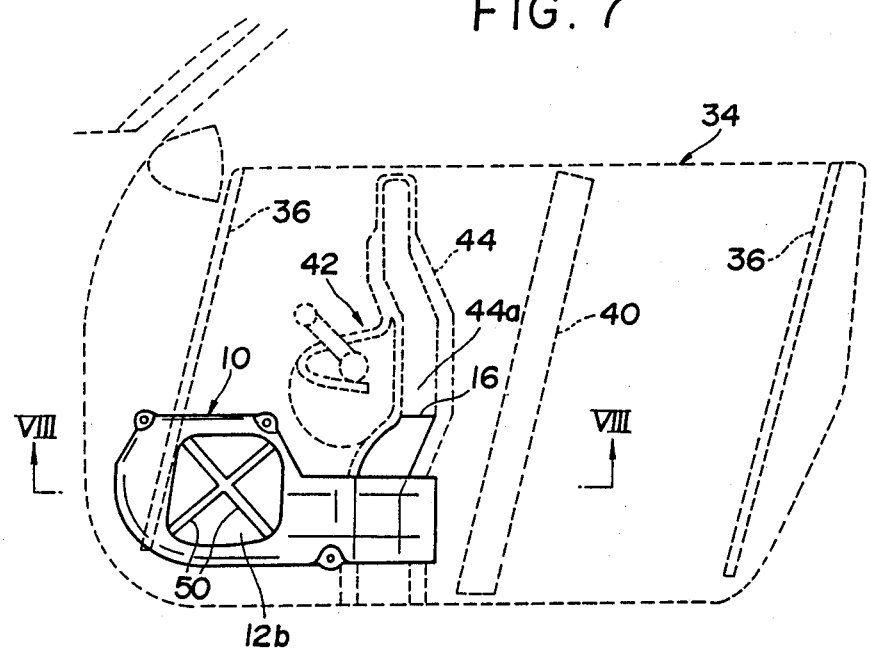
FIG. 7 is an explanatory side view of a vehicle door having a speaker box according to the invention mounted therein.
Figure 8:
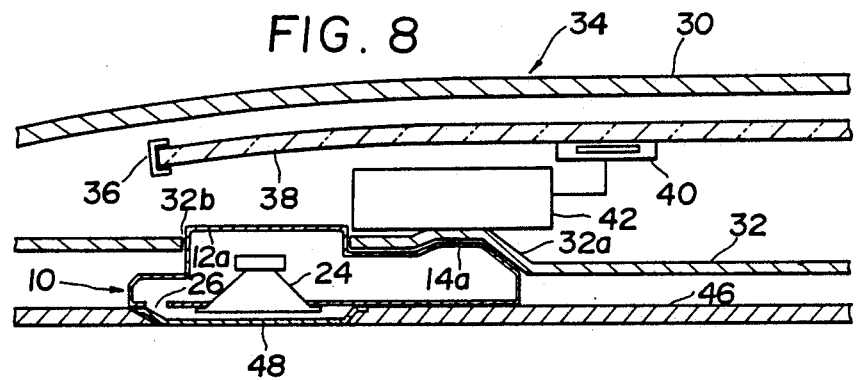
FIG. 8 is a sectional view taken along line VIII—VIII in FIG. 7.

This will be better understood from FIG. 7, which is an explanatory side view of a vehicle door, and FIG. 8, which is a sectional view taken along line VIII—VIII in FIG. 7. The vehicle door denoted by reference 34 in these figures is defined by an outer panel 30 and inner panel 32. Most of the space between the outer an inner panels 30, 32 is taken up by a window pane raising/lowering mechanism including the window pane 38 itself (FIG. 8), window pane guides 36, a window pane passage, a regulator 40, a drive mechanism 42 and the like. Moreover, as shown in FIG. 8, the configuration of the remaining space within the door 34 is further complicated by the presence of an indentation 32a formed at an appropriate portion of the inner panel 32 for increasing the strength thereof. What is more, to obtain optimum acoustic effect, it is preferable to mount the speaker rather toward the front of the vehicle, and this puts a further restriction on places available for mounting it. In accordance with the present invention, however, the speaker can be more ideally positioned since, as described in the foregoing, it is configured in an irregular shape matched to the space available for it. More specifically, the speaker box 10 according to this invention is provided with the projecting section 16 which is so shaped as to be snugly insertable into and interior space 44a within a reinforcing member 44, as shown in FIG. 7. Further, the protuberance 14a of the speaker box 10 is configured so as to fit within the reinforcing indentation 32a of the inner panel 32 without leaving any gaps between itself and this portion of the inner panel 32. Meanwhile, the cylindrical section 12a of the speaker box 10 is configured and positioned so as to fit snugly into an opening 32b originally provided in the inner panel 32 for the purpose of allowing a worker to access the door interior. As a result of its special configuration, therefore, the speaker box 10 can be secured within the door 34 not only by the screw bracket portions 18 but also by the mating of its irregular shape with complementary spaces within the door 34. Another advantage provided by the irregular configuration is that the rigidity and strength of the speaker box 10 itself is increased. Still another is that it enables the speaker box 10 to have the largest inner volume possible for a box to be mounted within the available internal space of the door 34. It will thus be understood from general knowledge regarding speakers that the increased inner volume of the speaker box 10 will make it possible to realize a proportional increase in the baffle effect and, in turn, better acoustic performance.

The interior side of the inner panel 32 is covered with an interior finishing material 46 which is cut away at an appropriate portion to allow a grill 48 stretched over the front surface of the speaker box 10 to be exposed within the vehicle interior.

Figure 1:
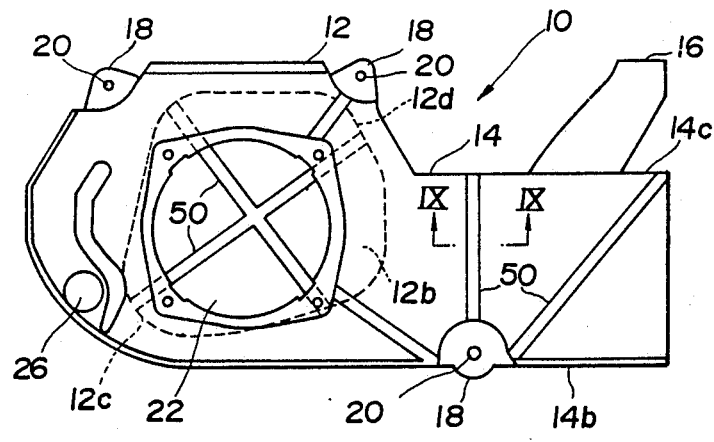
FIG. 1 is a plan view of a speaker box for car radios or the like according to this invention.
Figure 9:
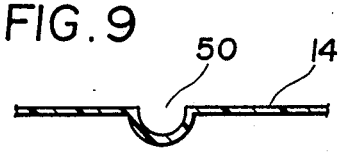
FIG. 9 is a sectional view taken along line IX—IX in FIG. 1.

Another feature of the speaker box according to this invention is that, as shown in FIGS. 1 and 7, a number of ribs 50 are provided on the floor 12b of the main body 12 and on the flat region of the front surface of the rectangular section 14. As shown in FIG. 9, the ribs 50 have a U-shaped cross section and, as shown in FIG. 1, extend from one edge 12c (14b) to the opposite edge 12d (14c) of the surface concerned, thus traversing the entire surface. As a result, each of the flat surfaces is divided by the ribs 50 into a number of flat surfaces of smaller area which, having increased rigidity, make the whole box more rugged. In consequence, the speaker box will not vibrate under sound pressure during use and will have higher resistance to the vibration it receives from the running vehicle when mounted within the door. On the other hand, since the speaker box 10 according to this invention is relatively large and has a rugged structure, it will, when mounted in a vehicle door as shown in FIGS. 7 and 8, increase the strength of the door against impact from the side as might be experienced during a collision. In other words, the speaker box 10 cooperates with the reinforcing member 44 in reinforcing the strength of the door 34.

Since the speaker box according to this invention is of monobloc construction and does not require the assembly of a plurality of components as has been necessary in prior art speaker boxes, it enables a significant improvement in fabrication efficiency as well as a substantial reduction in production cost. Further, as the monobloc molding method employed eliminates any risk of faulty sealing, the speaker box is further advantageous in that it enables the previously required pre-shipment inspection for air leakage to be dispensed with.

The present invention has thus been shown and described with reference to specific embodiments. However, it should be noted that the present invention is in no way limited to the details of the described arrangements but changes and modifications may be made without departing from the scope of the appended claim.

What is claimed is:

1. A speaker box mounted within a vehicle for housing an acoustic speaker unit, comprising a monobloc molded box having an irregular configuration, and including a generally disc-shaped main body and a box-like section formed integrally therewith so as to fit within complementary internal spaces within said vehicle, wherein said molded box has an integral portion which is fitted within reinforcing portions of said vehicle, and wherein said molded box surrounds an enlarged inner volume for providing improved acoustic performance for said speaker box.

2. A speaker box according to claim 1 wherein said monobloc molded box comprises a blow molded box.

3. A speaker box according to claim 1 wherein said speaker box has a flat region which is provided with a rib thereon.

4. A speaker box according to claim 3 wherein said rib extends from one edge of said flat region to the opposite edge thereof, traversing the entire distance between said edges.

5. A speaker box according to claim 4, wherein said rib is U-shaped in cross section.

6. A speaker box according to claim 1, wherein said projection projects from said box-like section and is formed integrally therewith.

7. A speaker box according to claim 1, further comprising a bass reflex vent.

* * * * *